United States Patent
Daughtry, Sr.

(10) Patent No.: US 6,969,832 B1
(45) Date of Patent: Nov. 29, 2005

(54) RADIANT FLOOR HEATING AND COOLING SYSTEM CLIP

(76) Inventor: Timothy Douglas Daughtry, Sr., 2480 Oakridge Dr., Harrah, OK (US) 73045

( * ) Notice: Subject to any disclaimer, the term of this patent is extended or adjusted under 35 U.S.C. 154(b) by 0 days.

(21) Appl. No.: 10/844,112

(22) Filed: May 12, 2004

Related U.S. Application Data

(60) Provisional application No. 60/471,500, filed on May 19, 2003.

(51) Int. Cl.[7] .............................................. H05B 3/06
(52) U.S. Cl. ..................... 219/531; 248/68.1; 248/74.2
(58) Field of Search ...................... 219/531, 532–535; 24/518, 543; 248/68.1, 74.2, 74.1, 51, 40, 248/49; 174/58; 285/319; 403/155, 397

(56) References Cited

U.S. PATENT DOCUMENTS

| | | |
|---|---|---|
| 2,480,427 A | 8/1949 | Stanton |
| 4,120,284 A * | 10/1978 | Cotsworth et al. ........... 126/659 |
| 4,338,994 A | 7/1982 | Hewing et al. |
| 4,566,660 A * | 1/1986 | Anscher et al. ............ 248/74.2 |
| 4,614,321 A * | 9/1986 | Andre ........................ 248/74.2 |
| 4,617,775 A | 10/1986 | Padrun |
| 4,688,961 A | 8/1987 | Shioda et al. |
| 4,889,006 A | 12/1989 | Kolinske et al. |
| 4,899,964 A | 2/1990 | Sick |
| 5,331,725 A * | 7/1994 | Chou ........................... 24/545 |
| 5,351,371 A | 10/1994 | DeVeau, Jr. et al. |
| 5,371,991 A | 12/1994 | Bechtel et al. |
| 5,697,591 A | 12/1997 | Cooper |
| D389,050 S * | 1/1998 | Li .............................. D8/395 |
| 5,807,018 A | 9/1998 | Peek et al. |
| 5,819,374 A * | 10/1998 | Chiles et al. ............. 24/16 PB |
| 5,846,017 A | 12/1998 | Meyer |
| 5,879,491 A | 3/1999 | Kobayashi |
| 5,931,381 A | 8/1999 | Fiedrich |
| 5,975,789 A | 11/1999 | Mathews |
| 6,105,216 A | 8/2000 | Opperthauser |
| 6,105,218 A | 8/2000 | Reekie |
| 6,186,698 B1 | 2/2001 | Knapp |
| 6,220,554 B1 | 4/2001 | Daoud |
| 6,283,382 B1 | 9/2001 | Fitzemeyer |
| 6,394,695 B1 | 5/2002 | Chausset |
| 6,467,734 B1 | 10/2002 | Brown et al. |
| 6,554,232 B1 * | 4/2003 | Macris ........................ 248/71 |
| 6,598,412 B1 | 7/2003 | Chen |

OTHER PUBLICATIONS

Radiant Heating Technology/Heating Catalog, p. 5.

* cited by examiner

*Primary Examiner*—Robin O. Evans
*Assistant Examiner*—Vinod Patel
(74) *Attorney, Agent, or Firm*—Martin G. Ozinga; Phillps McFall McCaffrey McVay & Murrah, P.C.

(57) ABSTRACT

A radiant heating and cooling system clip for positioning a tube and construction support wire with one hand comprising an interior having a main channel for positioning a tube with a narrowing second channel within said main channel for positioning a wire.

1 Claim, 2 Drawing Sheets

RADIANT FLOOR HEATING AND COOLING SYSTEM CLIP

CROSS-REFERENCE TO RELATED APPLICATIONS

Priority is claimed from provisional application U.S. Ser. No. 60/471,500 filed on May 19, 2003, and incorporated by reference herein.

BACKGROUND OF THE INVENTION

1. Field of the Invention

In general, the present invention relates to an improved clip or fastener. More specifically, the present invention provides a cheap and efficient means to secure tubing commonly associated with radiant heating and cooling systems with wire mesh commonly associated with structural support with concrete in the construction of radiant floor heating and cooling systems.

2. Description of the Prior Art

Radiant floor heating (RFH) and radiant wall heating (RWH) are techniques of heating rooms in a dwelling or commercial building for human and creature comfort. It is believed by many that radiant heating is the ideal way to warm the human body. Europeans have revitalized a modern form of hydronic radiant floor heating in the last few decades after it had been out of use since the Romans first used warm air floor heating systems in their villas two thousand years ago.

Radiant heating warms the surfaces of a room: the floor, the walls, the furniture, which become heat sinks, slowly giving off their warmth to the cooler surroundings. People and creatures in the room then absorb this heat as needed. It can be compared to walking barefoot on warm earth that has been heated by the rays of the sun when surrounding air temperature is cool; however, as long as there is no breeze, one feels comfortably warm.

Furthermore, in a radiant heating system, the warm temperatures are kept at floor level and radiate up wards; and, since there is no circulating air, there is not a hot pocket of air formed at the ceiling level. With radiant floor heating, one actually experiences cooler temperatures at head level and warmer temperatures at foot level which results in comfort and warmth.

In the past, tubing materials, control devices and proper installation techniques had not been perfected and so radiant heating was not used. However, the present reliability of controls, special installation techniques, and, particularly the development of very strong flexible plastic tubing, called PEX tubing, with its two decade record of successful installations embedded in cement floors, eliminates many causes for concern.

A heating loop may include several heating elements like wall mounted radiators and/or baseboard finned tubing that are the principal heat exchangers of the loop, or the tubing itself may be the principal heat exchanger of the loop. In the latter case the tubing is usually buried in a layer of concrete that forms the floor of a room and so the tubing heats the concrete slab, which is the floor. The concrete that the tubing is buried in is a special kind for the purpose and the heat exchange is principally by conduction and radiation to the concrete, which in turn heats the room by some conduction and convection, but principally by radiation. Similarly, the tubing is sometimes mounted in a wall embedded in a layer of concrete and this is called Radiant Wall Heating (RWH).

In such RFH and RWH systems and other hydronic heating systems using wall radiators and/or baseboard finned tubing elements, the supply water temperature from the boiler which may be regulated for heating. Further, such systems may be used for cooling wherein colder or cool water is run through the system.

In the construction and installation of these systems, it is not unusual for a substantial portion of time being devoted to the placement of the PEX tubing. In the prior art, such placement is routinely time consuming due to the inherit issue of holding a "bend" in the tube without restricting, crushing or otherwise damaging the tube while the concrete is poured and allowed to harden. And although the PEX tubing is flexible, it requires numerous fastening devices to hold the desired pattern in place while the concrete is laid.

In the prior art, it is common to find "zip" ties or tie wraps which require use of two hands to hold the tubing to the mesh while pulling down one end through the holder of the zip tie or tie wrap. This method does not allow for quick use and frequently causes a poor installation when the tie is too tight thereby damaging the tube or otherwise restricting the passageway of the tube. Furthermore, if the tie is not tight enough, it allows too much movement of the tube during the pouring of the concrete which in turn may damage or otherwise impede the passageway of the tubing.

Also in the prior, it is not uncommon to use wire ties. These types of ties are frequently strands of relatively flexible metal wire that may be wrapped around the desired items and then the ends are twisted together to secure the tie. This method also needs two hands to hold the wire, put the ends together and twist the wire ends. Likewise, this method often leads to poor installation when the wire is too tight and thus restricting or damaging the passageway of the tubing or conversely being too lose wherein the tubing is allowed to move from its desired shape during the pouring and setting of the concrete.

Although there are numerous clips and fasteners, the prior art has failed to bridge the gap between industry needs and currently available products. Likewise, there is a desire to improve and facilitate the installation of radiant floor heating and cooling systems in a secure fashion during the construction process. Therefore, an extensive opportunity for advancements and innovation remains where the prior art fails or is deficient.

SUMMARY OF THE INVENTION

In view of the foregoing disadvantages inherent in the known types of clips and fasteners now present in the prior art, the present invention provides a new and improved construction clip for radiant floor heating and cooling systems wherein the same can be utilized reliably in those situations where safety, cost and ease of operations are desired. As such, the general purpose of the present invention, which will be described subsequently in greater detail, is to provide a new and improved radiant floor heating and cooling system clip which has all the advantages of the prior art devices and none of the disadvantages.

To attain this, the present invention essentially comprises a single piece construction of a clip or fastening device with a first portion or receptacle channel for receiving and generally holding strands of wire mesh commonly found in concrete construction methods and a second portion or receptacle channel for receiving and holding in place larger diameter tubing wherein fluids or elements for heating and cooling may pass through therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved radiant floor heating and cooling system clip which may be easily and efficiently manufactured and marketed. Likewise, the present invention works in cooperation with existing radiant floor heating and cooling system components and will not deteriorate.

It is a further object of the present invention to provide a new and improved radiant floor heating and cooling system clip which is of a durable and reliable construction. As such, the present invention is compatible with tubing used in the industry as well as wire mesh found in concrete construction.

An even further object of the present invention is to provide a new and improved radiant floor heating and cooling system clip which is susceptible to a low cost of manufacture with regard to both materials and labor, and which accordingly is then susceptible to low prices of sale to the consuming industry, thereby making such economically available to the buying public.

Still another object of the present invention is to provide a new and improved radiant floor heating and cooling system clip which provides all of the advantages of the prior art, while simultaneously overcoming some of the disadvantages normally associated therewith.

Another object of the present invention is to provide a new and improved radiant floor heating and cooling system clip which reduces construction and installation time of radiant floor heating and cooling systems. The present invention eliminates the use of time consuming zip ties or standard wire ties.

Another object of the present invention is to provide a new and improved radiant floor heating and cooling system clip which may be allow an individual to perform the function of securing the radiant heating and cooling system tubing in a fixed and desired position with a single hand and keep the tubing in place while the concrete flooring is poured and hardens.

An even further object of the present invention is to provide a new and improved radiant floor heating and cooling system clip that will not collapse, cut or otherwise restrict the tubing used to pass heating and cooling fluids.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings, illustrations, and pictures wherein.

DETAILED DESCRIPTION OF THE PREFERRED EMBODIMENTS

Figure 1:
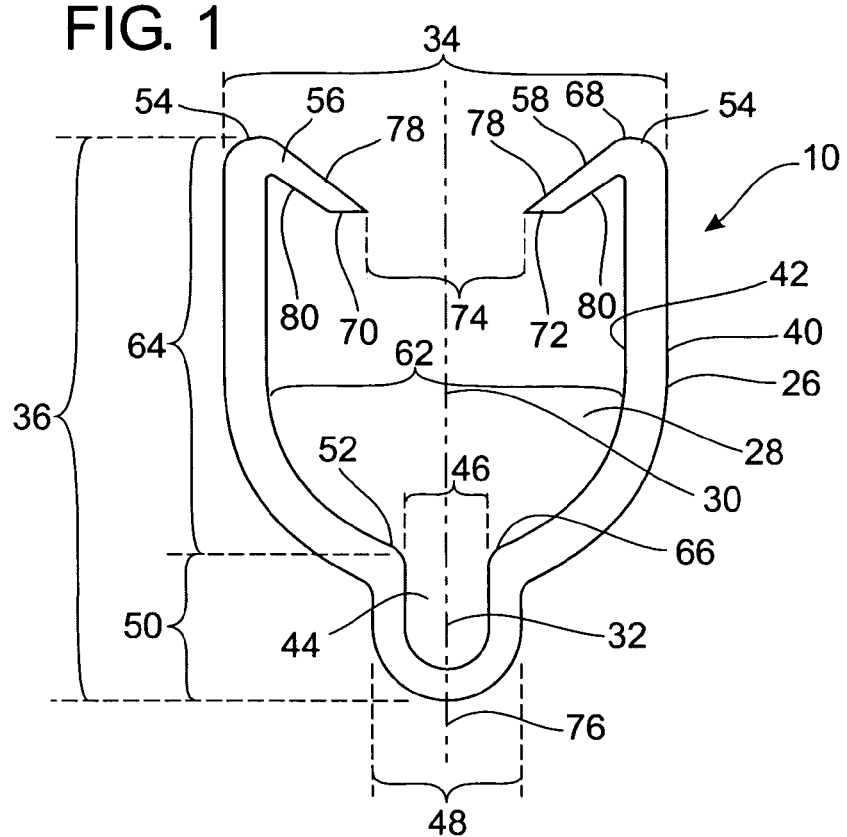
FIG. 1 is a general front plan view of a preferred embodiment of the invention.
Figure 2:
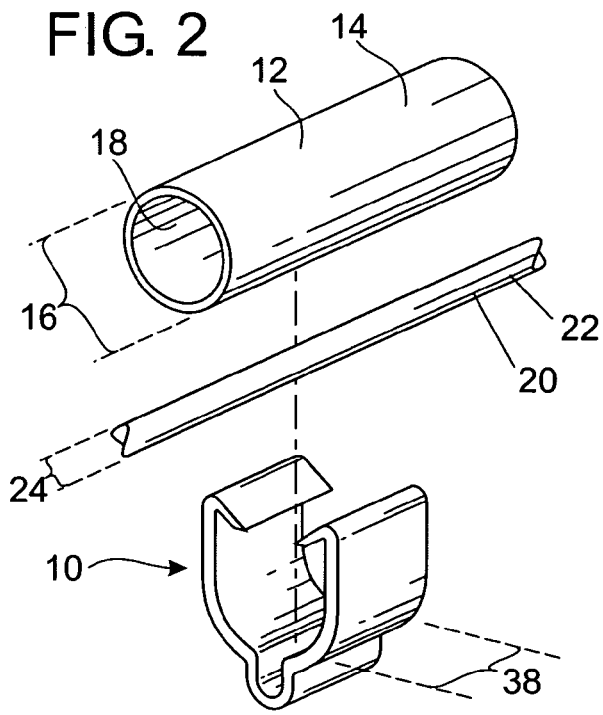
FIG. 2 is a general perspective view of a preferred embodiment of the invention with tubing and wire arrangement.
Figure 3:
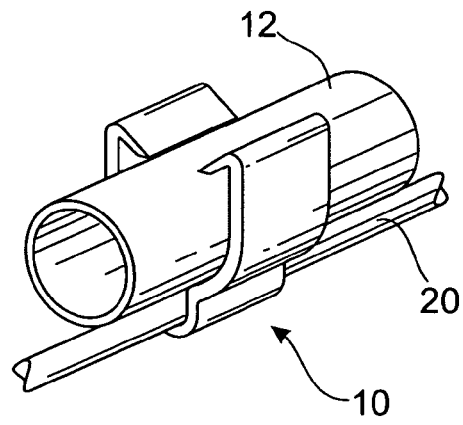
FIG. 3 is a general perspective view of a preferred embodiment of the invention attached to a wire mesh and a conduit or tube.
Figure 4:
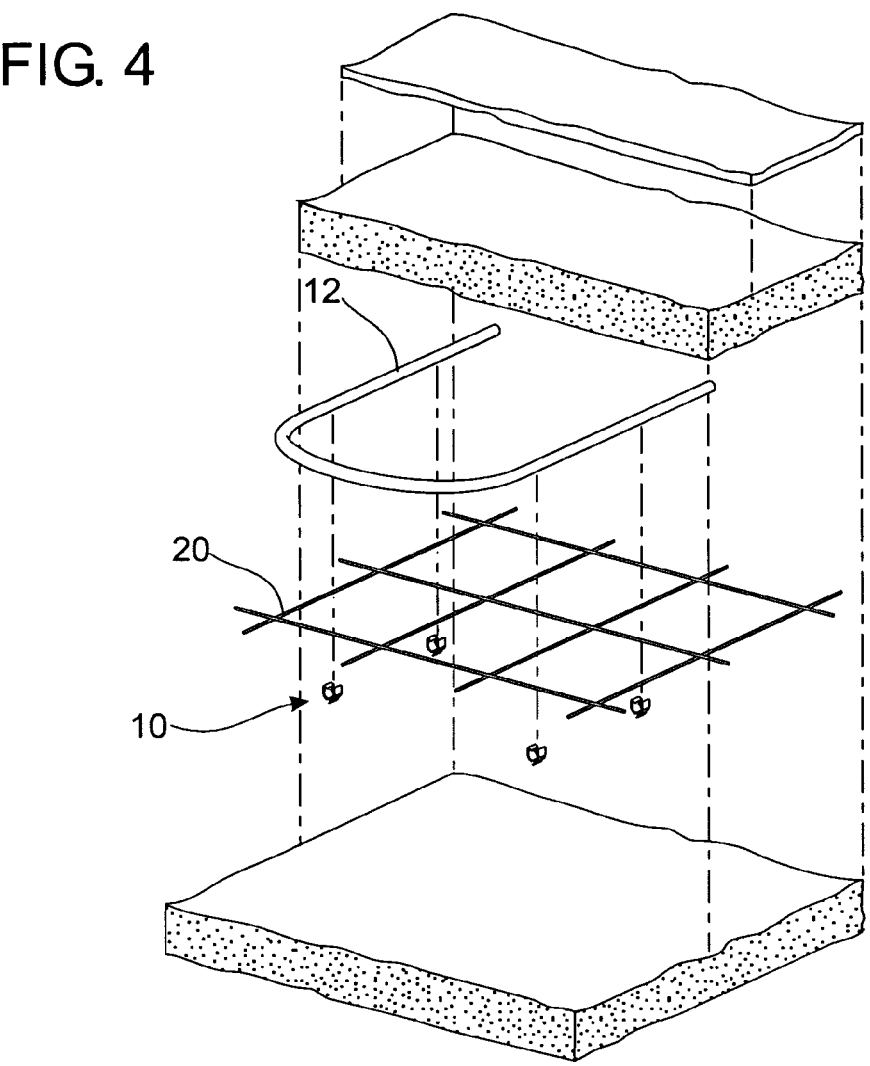
FIG. 4 is a partial exploded view of a preferred embodiment of the invention generally depicting placement.
Figure 5:
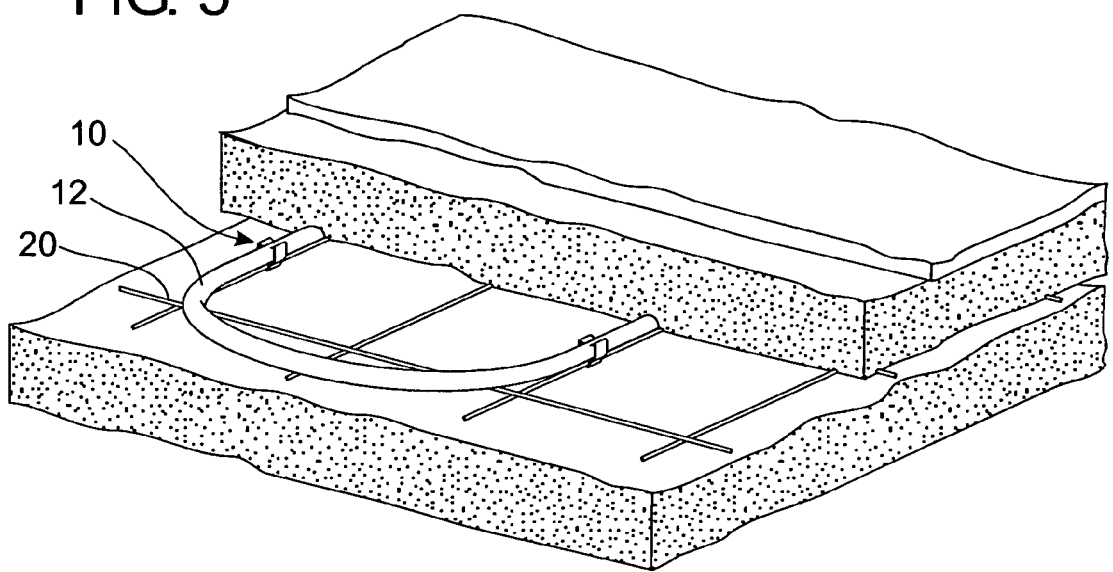
FIG. 5 is a partial perspective view of a preferred embodiment of the invention generally depicting placement.

Referring to the drawings in detail and to FIGS. 1 and 2 in particular, reference character 10 generally designates a new and improved radiant floor heating and cooling system clip in accordance with the present invention. It is understood that the term "clip" should not be considered limiting and that the reference is to a fastener, connector and so forth that may hold at least two different items together in a secured fashion. In a preferred embodiment, invention 10 may generally be used for radiant floor heating and cooling systems which will be described in greater detail below.

It is contemplated that in a preferred construction, invention 10 is made from polyvinyl chloride polymer, also more commonly referred to as PVC. It is understood that other materials may be utilized or combination of materials such as other forms of plastic, composite materials, metals, wood, man made or natural rubber, and so forth. Furthermore, in a preferred construction, invention 10 is of a uni-body or single piece construction made from extruded exterior grade rigid PVC having a minimum of 10 PHR of titanium Dioxide for weathering and impact properties.

It is understood, however, that invention 10 may be used for other construction applications wherein it is desired to clip or fasten at least two items in a relatively secure manner and generally parallel but not necessarily limited to just parallel. Likewise, it is contemplated that invention 10 may generally be used to secure two items in general parallel formation and thus the items may be of numerous configurations and utility. The examples herein for the two items to be secured should not be considered limiting and are for general purposes of illustrating a preferred embodiment.

In a preferred embodiment, invention 10 may be utilized with hollow or non hollow tubing or conduit such as but not limited to PEX tubing, hereinafter collectively referred to as tubing 12. It is understood that tubing 12 may be of a solid structure wherein no passageway is supplied. It is contemplated that tubing 12 may be electrical wiring, metal, or other material in which heating or cooling may be achieved. Tubing 12 further includes a cylindrical wall 14 having an outer diameter 16 and an interior passageway 18. In the industry, tubing 12 is often referred to by its inner diameter size such as ½ inch or ¾ inch wherein, by example, the outer diameter 16 of the ½ tubing 12 may be ⅝ inch (or 0.625 inch). It is contemplated that smaller or greater outer diameter 16 may be utilized as well as corresponding inner diameter 18.

Furthermore, in accordance with a preferred embodiment, invention 10 may be utilized in conjunction with wire, wire mesh, welded wire mesh, rebar and so forth, hereinafter collectively referred to as wire 20. It is contemplated that wire 20 may be non-metal such as but not limited to plastic or other man made and even natural material. It is understood that wire 20 is generally referred to construction material used in the radiant heating and cooling system construction typically associated with reinforcement of concrete, although the same should not be considered limited to such. It is further contemplated that wire 20 may be of an electrical conduit nature, other type tubing such as PEX, and so forth. Wire 20 may further include a cylindrical wall 22 having an outer diameter 24 and may or may not have an interior passageway. Wire 20 outer diameter 24 may be 0.125 inch (⅛ inch) or up to 0.162 inch. It is contemplated that smaller or greater outer diameter 24 may be utilized. It is further contemplated that wire 20 may be "8 gauge".

In a preferred construction, invention 10 includes an exterior 26 defining an interior 28. In a preferred construction, interior 28 generally comprises a main channel 30 wherein tubing 12 may be located and a second channel 32 therein where wire 20 may be located. An aspect of the invention is the ability to first lay wire 20 in a relatively fixed position underneath tubing 12 wherein wire 20 is generally trapped in place by tubing 12 when tubing 12 is positioned in invention 10 interior 28. Furthermore, an advantage of the aforementioned construction is the ability to place invention 10 in a generally desired location and secure wire 20 and tubing 12 from the same direction of travel, i.e. push wire 20 into invention 10 and then from the same general direction push tubing 12 into invention 10 trapping wire 20. This preferred construction allows an operator to essentially use a single hand to achieve the desired construction by grasping invention 10 with one hand, placing wire 20 into invention 10 and (possibly using a finger or thumb to seat wire 20 into second channel 32) then continuing motion in the same direction placing tubing 12 into invention 10 interior 28 main channel 30. In a preferred construction, an operator may generally lay out wire 20 in the desired location, then generally lay tubing 12 in a general desired pattern, use one hand to hold tubing 12 in a "bend" or other desired shape while using a second hand to secure wire 20 and tubing 12 with invention 10.

In a preferred construction, invention 10 has a total width 34 of 0.785 inches, a total height 36 of 1.075 inches, a total depth 38 of 0.75 inches. In accordance with a preferred construction, invention 10 includes a wall 40 having an exterior face defining exterior 26 and an inner face 42 generally defining interior 28. Wall 40 may be of a 0.080 inch thickness, but is not limited to such.

Second channel 32 interior 44 may generally have a width 46 of sufficient proportion to accommodate wire 20. In a preferred construction wire 20 should press fit in a relatively snug fashion into second channel 32. Width 44 may be 0.162 inch and further comprise a rounded portion proportional to wire 20. Further, second channel 32 may be of an overall width 48, which would include interior width 46 and combined relative wall 40 thicknesses, of 0.322 inch. Second channel 32 may have a general overall height 50 of 0.31 inch which would generally include wall 40 thickness and essentially measure to the start of main channel 30. In a preferred construction, second channel 32 is essentially a horseshoe configuration or almost literally "U" shaped, but not necessarily limited to such.

Also in a preferred construction, main channel 30 is essentially a horseshoe configuration or almost literally "U" shaped, but not necessarily limited to such. At top 52 of main channel 30 is a tubing 12 retention members 54 which generally comprise a first member 56 and a second member 58. Generally, tubing 12 may be squeezed through the retention members 54 which open up in interior 28 and specifically main channel 30. This one way configuration allows for general pushing of tubing 12 so that it narrows as it travels down retention members 54 which in essence deform tubing 12 as it passes. Once tubing 12 has passed retention members 54 and is in main channel 30, tubing 12 is allowed to reform to tubing 12 original shape and essentially be trapped in main chamber 30 by retention members 54.

In a preferred construction, main channel 30 has a total width 34 of 0.785 inches (which would include wall 40 thickness of 0.80, interior width 62 of 0.625 inches and wall 40 thickness of 0.80), a total height 64 of 0.765 inch (measured from essentially top 52 of second channel 32/bottom 66 of main channel 30 to top 68 of main channel 30).

In accordance with a preferred embodiment, retention members 54 first member 56 distal end 70 and second member 58 distal end 72 may have a distance between or opening 74 which may be 0.310 inches. Further, first member 56 distal end 70 and second member 58 distal end 72 may be generally positioned 0.140 from top 68 of main channel 30, and 0.26 from wall 40 exterior respectively, and generally be tapered. First member 56 and second member 58 may also be generally angled 59 degrees from top surface 78 of each member to the symmetric middle 76 of invention 10. Interior surface 80 of respective members may be generally 50 degrees, thus giving a taper.

An example of a preferred construction for a radiant heating and cooling system clip for positioning a tube and construction support wire with one hand comprises a interior having a main channel for positioning said tube with a narrowing second channel within said main channel for positioning said wire wherein the tube is a PEX tube, the PEX tube has an inner diameter of ½ inch, the PEX tube has an outer diameter of ⅝ inch, the wire is made from metal, the wire is formed into a mesh, the metal wire has an outer diameter of ⅛ inch, the PEX tube and metal wire are positioned in parallel in the clip, and the clip further includes a pair of retention members that prevent said PEX tube from leaving the second channel after the tubing is placed in the second channel.

Another example for a radiant heating and cooling system clip for positioning PEX tubing and wire in parallel comprises an interior having a first U shape for positioning said PEX tubing and a second conjoined U shape for positioning said wire wherein said second conjoined U shape is accessible for positioning said wire from said interior.

It is understood that numerous other dimensions are contemplated of greater and smaller values and the aforementioned is for purposes of illustration of a preferred embodiment. Changes may be made in the combinations, operations, and arrangements of the various parts and elements described herein without departing from the spirit and scope of the invention. Furthermore, names, titles, headings and general division of the aforementioned are provided for convenience and should, therefore, not be considered limiting.

I claim:

1. A radiant heating and cooling system clip for holding together a tube and a wire in parallel comprising:

a body having an exterior defining an interior;

said interior having a U-shaped main channel having a symmetric middle with a top portion defining an entrance to said interior wherein said main channel is provided for positioning said tube and a narrowing second U-shaped channel within for positioning said wire below said tube; and a first retention member and a second retention member each having a top surface and interior surface wherein each top surface is generally angled 59 degrees to the symmetric middle and each interior surface is generally angled 50 degrees to the symmetric middle forming a first retention member having a tapered distal end and a second retention member having a tapered distal end positioned respectively on each side of said entrance to said main channel and wherein said first retention member tapered distal end and said second retention member tapered distal end allow said tube to enter said main channel and trapping said tube in said main channel.

* * * * *